United States Patent
Abraham et al.

(10) Patent No.: US 8,972,921 B2
(45) Date of Patent: Mar. 3, 2015

(54) SYMMETRIC PLACEMENT OF COMPONENTS ON A CHIP TO REDUCE CROSSTALK INDUCED BY CHIP MODES

(71) Applicant: International Business Machines Corporation, Armonk, NY (US)

(72) Inventors: David W. Abraham, Croton, NY (US); Jerry M. Chow, White Plains, NY (US); Jay M. Gambetta, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/827,706

(22) Filed: Mar. 14, 2013

(65) Prior Publication Data
US 2014/0266406 A1    Sep. 18, 2014

(51) Int. Cl.
*G06F 17/50* (2006.01)
*G06N 99/00* (2010.01)
*B82Y 10/00* (2011.01)

(52) U.S. Cl.
CPC .............. *G06N 99/002* (2013.01); *B82Y 10/00* (2013.01)
USPC ........................................................ 716/115

(58) Field of Classification Search
CPC ................................. G06F 17/30; G06F 17/50
USPC ........................................................ 716/115
See application file for complete search history.

(56) References Cited

U.S. PATENT DOCUMENTS

| | | | |
|---|---|---|---|
| 3,020,543 A | 2/1962 | Li | |
| 3,964,014 A | 6/1976 | Tehon | |
| 4,561,067 A | 12/1985 | McKeown | |
| 4,725,797 A | 2/1988 | Thompson et al. | |
| 5,107,586 A | 4/1992 | Eichelberger et al. | |
| 5,912,472 A | 6/1999 | Voigtlaender et al. | |
| 6,130,483 A | 10/2000 | Shizuki et al. | |
| 6,156,165 A | 12/2000 | Pierson et al. | |
| 6,232,854 B1 | 5/2001 | Mikami et al. | |
| 6,297,551 B1 | 10/2001 | Dudderar et al. | |
| 6,900,454 B2 | 5/2005 | Blais et al. | |
| 7,321,884 B2 | 1/2008 | Burkard et al. | |
| 7,830,022 B2 | 11/2010 | Theuss et al. | |
| 7,834,422 B2 | 11/2010 | Andresen et al. | |
| 7,847,615 B2 | 12/2010 | Yorozu et al. | |
| 7,932,514 B2 | 4/2011 | Farinelli et al. | |
| 8,247,799 B2 | 8/2012 | Bunyk et al. | |
| 2005/0001209 A1* | 1/2005 | Hilton et al. | 257/20 |
| 2005/0184284 A1 | 8/2005 | Burkard et al. | |
| 2006/0225165 A1* | 10/2006 | Maassen van den Brink et al. | 977/933 |
| 2009/0167342 A1* | 7/2009 | van den Brink et al. | 326/4 |

(Continued)

OTHER PUBLICATIONS

Altomare et al., "Measurement crosstalk between two phase qubits coupled by a coplanar waveguide", Physical Review B, vol. 82, (2010), pp. 1-7.

(Continued)

*Primary Examiner* — Jack Chiang
*Assistant Examiner* — Mohammed Alam
(74) *Attorney, Agent, or Firm* — Cantor Colburn LLP; Vazken Alexanian

(57) ABSTRACT

A method and system to control crosstalk among qubits on a chip are described. The method includes placing two or more components symmetrically on the chip, the chip including the qubits, and driving two or more ports symmetrically to control the crosstalk based on controlling coupling of chip mode frequencies and qubit frequencies.

17 Claims, 6 Drawing Sheets

(56) References Cited

U.S. PATENT DOCUMENTS

2011/0022340 A1    1/2011   Divincenzo et al.
2011/0022820 A1*   1/2011   Bunyk et al. .................. 712/1
2012/0098698 A1    4/2012   Reuter
2012/0319085 A1*  12/2012   Gambetta et al. ............. 257/31
2012/0326720 A1   12/2012   Gambetta et al.

OTHER PUBLICATIONS

Ansmann et al., "Violation of Bell's inequality in Josephson phase qubits", Nature, vol. 461, Sep. 24, 2009, pp. 504-506.
Blanvillain et al., "Suppressing on-chip electromagnetic crosstalk for spin qubit devices", Journal of Applied Physics, vol. 112, (2012), pp. 1-6.
Gambetta et al., "Characterization of addressability by simultaneous randomized benchmarking", arXiv 1204 6308, Apr. 27, 2012, pp. 1-5.
Houck et al., "Controlling the Spontaneous Emission of a Superconducting Transmon Qubit" Physical Review Letters, vol. 101, (2008), pp. 1-4.
Reed et al., "Fast reset and suppressing spontaneous emission of a superconducting qubit", Applied Phyiscs Letters, vol. 96, (2010), pp. 1-3.
Rigetti et al., "Fully microwave-tunable universal gates in superconducting qubits with linear couplings and fixed transition frequencies", Physical Review B, vol. 81, (2010), pp. 1-7.
Wenner et al., "Wirebond crosstalk and cavity modes in large chip mounts for superconducting qubits", Supercond. Sci. Technol., vol. 24, (2011), pp. 1-7.
Gambetta et al., "Superconducting Quibit with Purcell Protection and Tunable Coupling" Physical Review Letters, vol. 106, (2011), pp. 1-4.
International Search Report and Written Opinion for PCT Application No. PCT/IB2014/058432, dated Mar. 11, 2014, pp. 1-6.
International Search Report and Written Opinion for PCT Application No. PCT/IB2014/058420, dated May 13, 2014, pp. 1-7.
Gambetta et al., "Entanglement of Two Superconducting Qubits in a Waveguide Cavity via Monochromatic Two-Photon Excitation", Physical Review Letters, 2012, pp. 1-5.
Gambetta et al., "Improved superconducting qubit coherence using titanium nitride", Applied Physics Letters, Jul. 3, 2013, pp. 1-4.

* cited by examiner

SYMMETRIC PLACEMENT OF COMPONENTS ON A CHIP TO REDUCE CROSSTALK INDUCED BY CHIP MODES

FEDERAL RESEARCH STATEMENT

This invention was made with Government support under Contract No.: W911NF-10-1-0324 awarded by the U.S. Army. The Government has certain rights in this invention.

BACKGROUND

The present invention relates to a quantum computing chip, and, more specifically, to the placement of components on a quantum computing chip.

In quantum computing, a circuit is contains many quantum bits (qubits), which are quantum oscillators. This circuit thus comprises the qubits, in addition to resonators and signal ports, formed as a thin film on a substrate. The oscillators (qubits) are connected explicitly by resonator buses in a pattern which is laid out on the supporting substrate surface. When interactions between qubits are controlled, and these interactions only occur in the fashion intended by the layout proscribed by the connecting resonators, the quantum computer will function as intended. However, if additional communication between qubits occurs, due to inadvertent coupling, for example, then the functioning of the quantum computer may not be as designed and calculations may fail. In addition, the qubits can suffer from connection to noise sources which manifest as undesirable perturbations in amplitude and phase (T1 and T2 relaxation). Longer coherence times (larger values for T1 and T2) correspond to a longer time to perform quantum operations before the system decoheres.

Several factors may contribute to crosstalk and to the perturbations in the oscillation which hasten the T1 and T2 relaxation. Signal ports are points on the circuit through which voltage may be applied to drive the circuit and output signals from the circuit are received. The substrate itself may be one source of crosstalk and/or decoherence. The substrate, typically formed of an insulating material with a high dielectric constant, may be viewed as a microwave resonator with chip resonant modes (chip modes) that may be close to the qubit frequency such that they couple with the qubit frequency. The chip modes may also facilitate unwanted interactions or crosstalk between qubits if the chip modes are excited while a qubit is being driven. In addition, the chip modes may cause decoherence (which we call here the Purcell effect or Purcell loss).

SUMMARY

According to one embodiment of the present invention, a method to control crosstalk among qubits on a chip includes placing two or more components symmetrically on the chip, the chip including the qubits; and driving two or more ports symmetrically to control the crosstalk based on controlling coupling of chip mode frequencies and qubit frequencies.

According to another embodiment of the present invention, a system to control crosstalk among qubits on a chip includes two or more components placed symmetrically on the chip, the chip including the qubits; and two or more drive signals applied symmetrically to two or more ports to control the crosstalk based on controlling coupling of chip mode frequencies and qubit frequencies.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, chip modes (resonant electromagnetic modes within the substrate may create crosstalk between qubits or introduce noise from the environment to the qubits. Eliminating sources of inadvertent communication between qubits is, therefore, a factor in the proper operation of a quantum computer. Embodiments of the invention described herein relate to symmetry in the layout of the circuit and the placement of components to reduce coupling to the chip modes. The embodiments described below include a method and system to control unwanted interactions among qubits (crosstalk) by controlling (reducing) the driving of chip modes.

Figure 1:
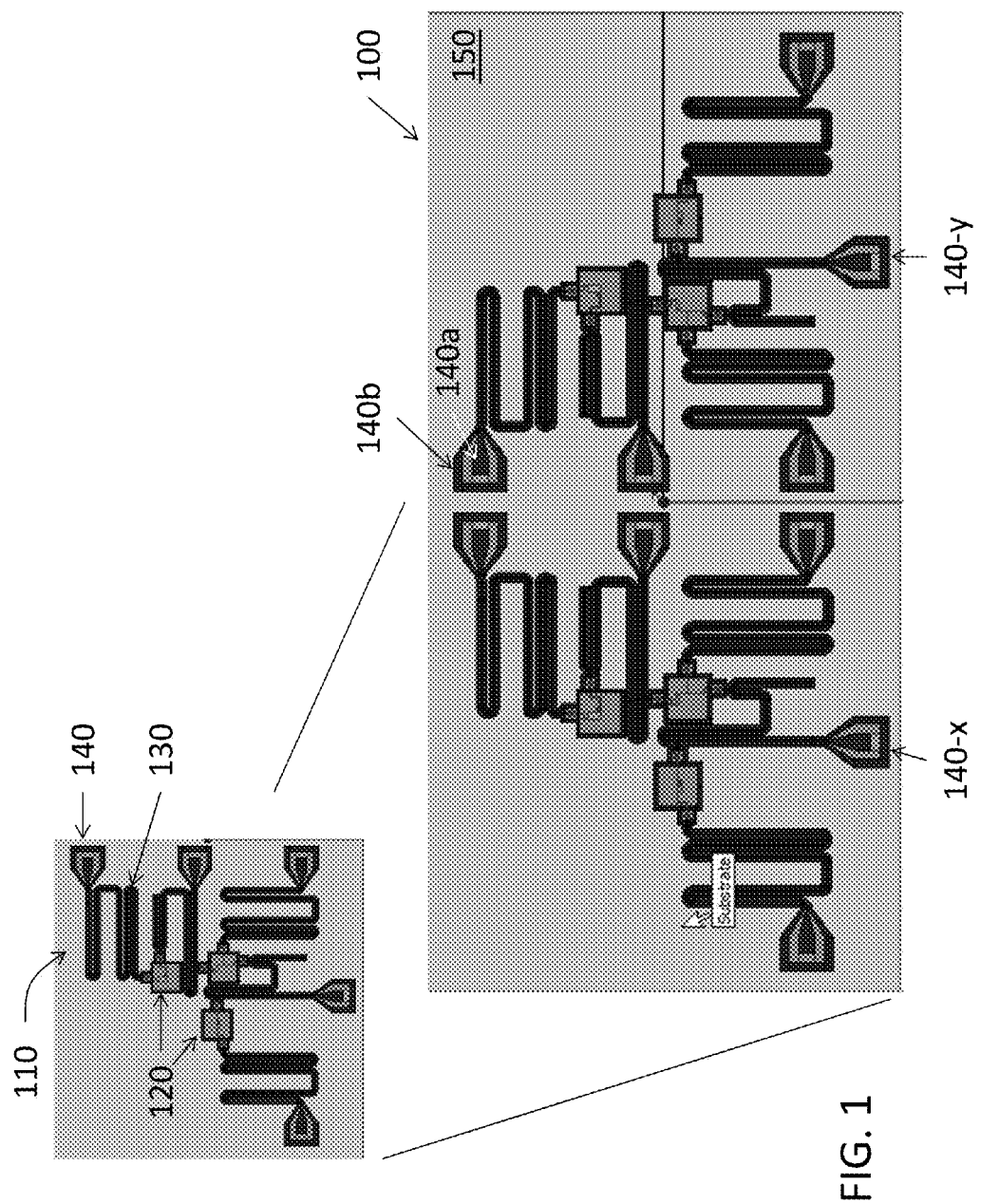
FIG. 1 illustrates a symmetric layout of a chip according to an embodiment of the invention.

FIG. 1 illustrates a symmetric layout of a chip 100 according to an embodiment of the invention. The embodiment of FIG. 1 illustrates a chip 100 comprising two circuits 110 arranged as mirror images of each other on a substrate 150. Each of the circuits 110 shown in FIG. 1 includes three qubits 120 that are interrogated by microwave pulses through their interaction with microwave resonators 130 or harmonic oscillators that store RF energy. The circuits 110 also each include five ports 140 through which drive signals are introduced and output signals of the circuit 120 are received.

Coupling of spurious energy into the qubit 120 may be caused by the resonators 130 or another energy reservoir such as chip modes, as noted above. A way to quantify the degree to which a qubit 120 is successfully isolated from the environment is to measure the transmission of microwave signals between nominally isolated qubits (i.e. crosstalk). In addition, the coherence times (T1 for amplitude and T2 for phase) of the qubit 120 can be measured as a function of chip mode frequencies. As noted above, embodiments of the invention described herein relate to addressing the coupling between chip modes and qubits through symmetry in the layout of the circuit and the placement of components.

The chip 100 shown in FIG. 1 includes two copies of each of the five ports 140. Each of the ports 140 may be driven by applying alternating current (AC) voltage (the drive signal) to the inner portion of the port 140a while the outer portion 140b is at ground. In order to avoid coupling to one or more chip modes and thereby reducing crosstalk between qubits 120, the same port 140 on each of the two circuits 110 (e.g., 140-x and 140-y) shown in FIG. 1 must be driven in such a way that they essentially cancel each other out. The driving signals for each of the two ports 140-x and 140-y would have the same bias. However, whether the two driving signals should have the same phase or be 180 degrees out of phase with each other depends on the relative symmetry of the circuits 110 and the chip modes. That is, applying drive signals that are out of phase with each other addresses coupling to chips modes that have the same symmetry as the two circuits 110 (shown in FIG. 1, for example). For the exemplary layout of the circuits 110 shown in FIG. 1, the drive signal for port 140-x should be out of phase with the drive signal for the port 140-y in order to avoid coupling to the fundamental chip mode. This is because the fundamental mode is odd and is anti-symmetric about a centerline of the substrate 150 (the centerline that the two circuits 110 are symmetric about). Generally, the layout of the circuits 110 is designed such that their symmetry does not match the chip modes to be avoided (symmetry assures the chip modes to which the ports 140 will not couple).

Figure 2:
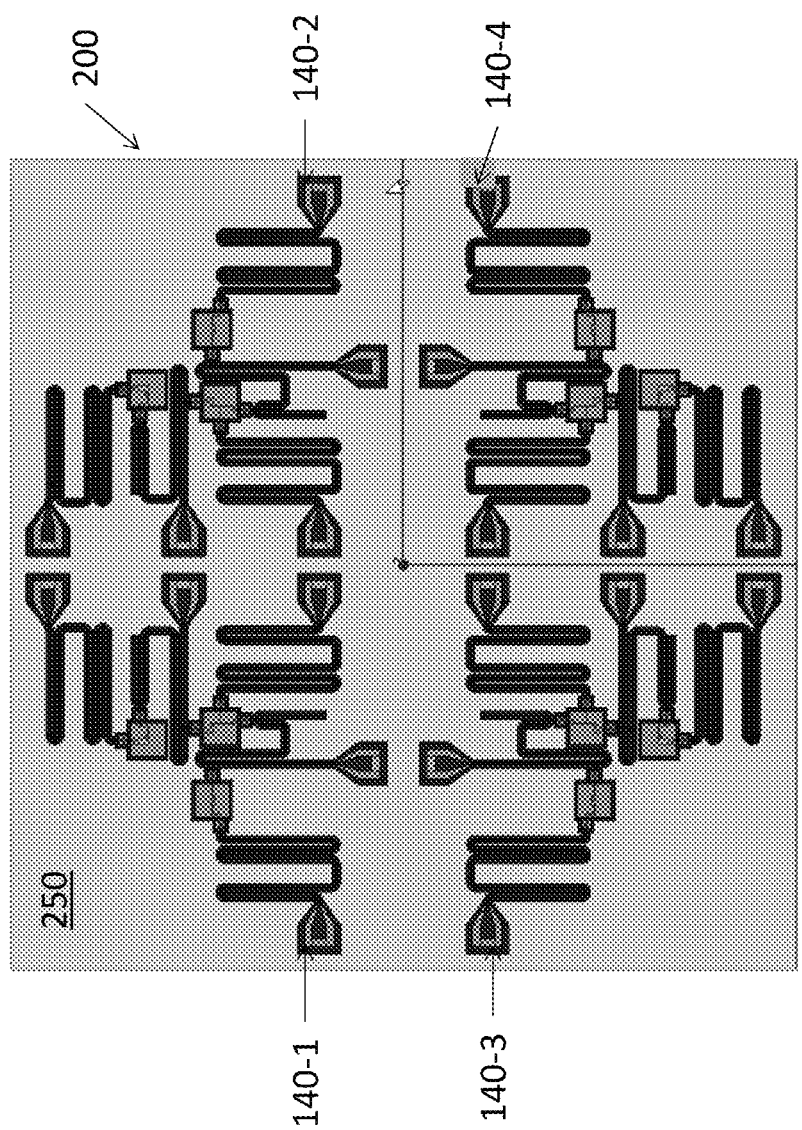
FIG. 2 illustrates a symmetric layout of a chip according to an embodiment of the invention.

FIG. 2 illustrates a symmetric layout of a chip 200 according to an embodiment of the invention. The embodiment of FIG. 2 illustrates a chip 200 comprising four circuits 110 on a substrate 250. In the present embodiment, the chip 200 includes four copies of each of the five ports 140. In this embodiment, copies of a port 140 may be driven in a quadrupole manner. For example, ports 140-1 and 140-4 may be driven by identical drive signals while ports 140-2 and 140-3 are driven by the same bias but out of phase by 180 degrees from the drive signals of ports 140-1 and 140-4. Such an arrangement avoids coupling to modes with symmetries about the perpendicular center lines of the chip 200. This arrangement may also be used to avoid driving chip modes with quad symmetry. That is, driving all four of the same ports 140 on all four of the circuits 110 improves crosstalk rejection over driving any two symmetric ports (e.g., 140-1 and 140-2 only or 140-2 and 140-4 only). Through the symmetric placement shown in FIGS. 1 and 2, coupling to the fundamental chip mode is avoided and crosstalk is reduced. Symmetric placement of individual components is detailed below.

Figure 3:
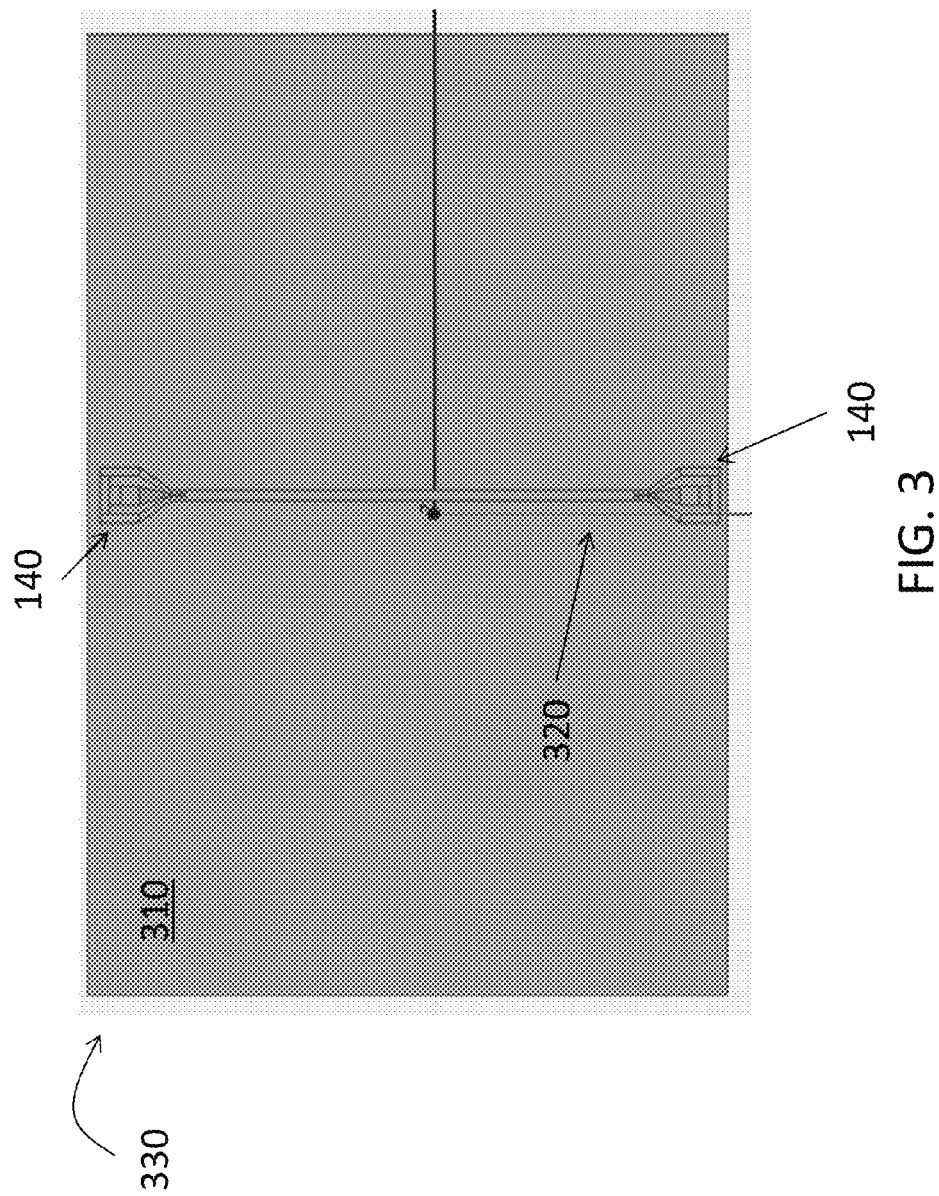
FIG. 3 illustrates symmetric placement of components according to an embodiment of the equation.
Figure 4:
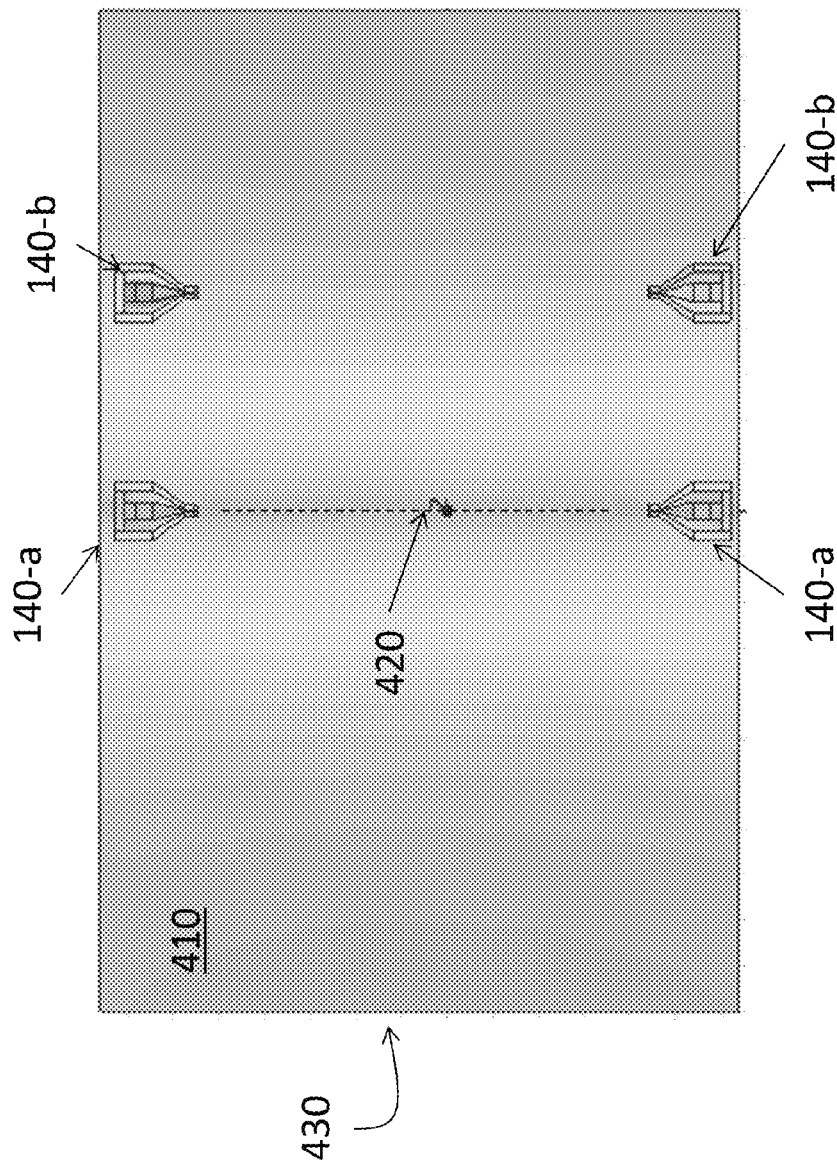
FIG. 4 shows two sets of ports to illustrate placement according to an embodiment of the invention.

FIG. 3 illustrates symmetric placement of components according to an embodiment of the equation. For the rectangular substrate 310 shown in FIG. 3, the line 320 that bisects the shorter dimension of the substrate 310 is a node for the lowest order chip mode. Placing components, such as qubits 120 (FIG. 1), that are small in lateral dimension compared with the chip 330 on the line 320 reduces coupling between the chip modes and the components (e.g., qubits 120). When a port 140 is located on a node (along line 320), direct crosstalk to qubits 120 when that port 140 is driven, for example, in order to couple to a resonant cavity, is eliminated. That is, when one port 140 is placed exactly on a node, then crosstalk via chip modes is eliminated. When two ports 140 are placed exactly on a node, then neither port 140 is responsible for any crosstalk. In a more realistic scenario, when two ports 140 are symmetrically placed near the node line 320, then crosstalk is reduced. According to the arrangement shown in FIG. 3, crosstalk reduction for one port 140 is doubled between the two ports 140. In the embodiment of FIG. 3, two ports 140 are placed nearly on the node line 320, the anode of the fundamental chip mode. There is no coplanar waveguide (CPW) connecting the ports 140, and a ground plane exits on the two largest surfaces of the chip 330 (perspective top or visible and bottom sides). FIG. 4 shows two sets of ports (140-a and 140-b) to illustrate placement according to an embodiment of the invention. Ports 140-a are on the symmetry line or node line 420 while ports 140-b are offset from the line 420. Driving the ports 140-a results in no coupling through the fundamental chip mode, but driving the ports 140-b results in 35 decibels (dB) more coupling in the example shown in FIG. 4.

Figure 5:
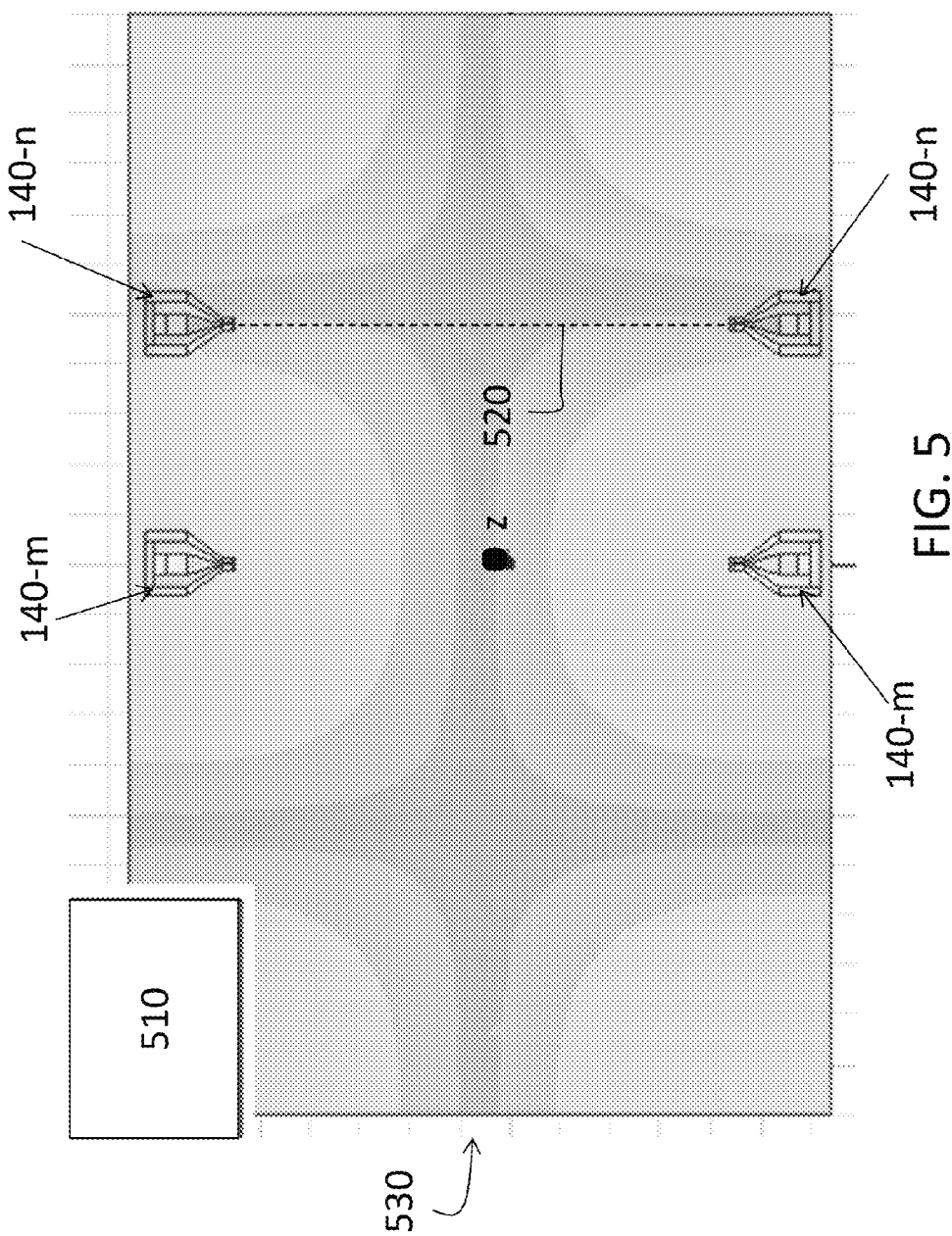
FIG. 5 shows two sets of ports to illustrate placement according to an embodiment of the invention.

The discussion with reference to FIGS. 3 and 4 addresses the fundamental chip mode frequency. Higher frequency chip modes also have node structures. However, because nodes of each of the chip modes are at different locations, locating components to uncouple all chip modes from the components is not possible. Because the largest source of chip-mode mediated crosstalk is the closest mode to the component frequency, removing that source of loss (i.e., focusing on the node of that mode) has a strong impact on qubit 120 (FIG. 1) performance. For example, if a higher frequency mode is of greatest concern, then placement of the nodes 140 may be adjusted to address the node of that mode. For example, FIG. 5 shows two sets of ports (140-m and 140-n) to illustrate placement according to an embodiment of the invention. Because the node of the higher frequency mode is at line 520 in this example (ports 140-n are placed on the node line 520), driving ports 140-n (compared with driving ports 140-m) results in a 50 dB attenuation in coupling. As noted above, if only one port 140 is placed on the node (corresponding with the chip mode frequency of interest), then crosstalk is still reduced as compared with a port 140 not placed on the node, but to reduce coupling the chip mode frequency with qubit frequencies, two ports must be symmetrically placed on the node and driven simultaneously.

Figure 6:
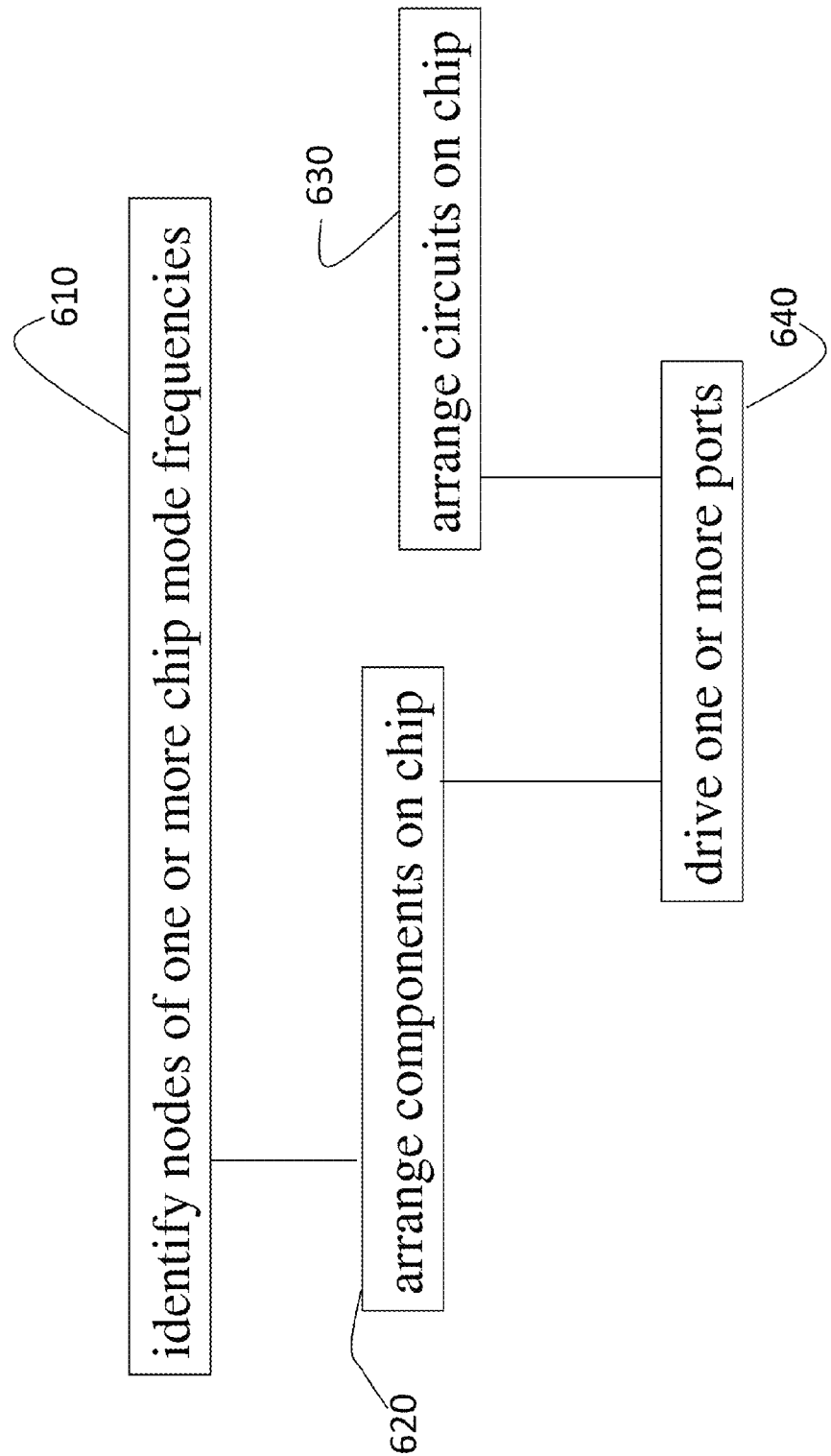
FIG. 6 is a process flow of a method of controlling crosstalk according to embodiments of the invention.

FIG. 6 is a process flow of a method of controlling crosstalk according to embodiments of the invention. The method illustrated by FIG. 6 addresses coupling between radio frequency (RF) components, such as qubits 130 (FIG. 1), of the chip (e.g., 100, 200, 330, 430, 530 shown in FIGS. 1-5, respectively) and one or more chip mode frequencies. At block 610, the process includes identifying nodes of one or more of the chip mode frequencies and may or may not be performed based on the whether component or circuit placement is of interest. At block 620, arranging components on the chip includes arranging a port 140 on a node to reduce crosstalk among qubits 120 or arranging ports 140 symmetrically on a node to address coupling between the chip mode frequency corresponding with the node and qubits 120 on the chip. At block 630, arranging circuits (130 shown in FIG. 1) on the chip includes scaling the chip to include two mirror image versions of the circuit (as shown in FIG. 1) or scaling the chip to include four copies of the circuit (as shown in FIG. 2) or more. Driving one or more ports 140 at block 640 includes driving a single port 140 located on a node to reduce cross talk or driving ports 140 symmetrically (with the same bias but, based on arrangement, with out of phase driving signals) as discussed with reference to FIGS. 1-5. As discussed above, the relative symmetry between the chip layout and the chip modes determines the relative phase among the drive signals to avoid coupling to chip mode frequencies.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagram depicted herein is just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method to control crosstalk among qubits on a chip, the method comprising:
    placing two or more components symmetrically on the chip, the two or more components including the qubits and two or more ports;
    driving the two or more ports symmetrically, using corresponding two or more drive signals, to control the crosstalk based on controlling coupling of chip mode frequencies and qubit frequencies, the driving symmetrically including each of the two or more drive signals including a same bias as and either a same phase as or a phase 180 degrees different than a phase of one or more other ones of the two or more drive signals.

2. The method according to claim 1, wherein the placing the two or more components includes placing two identical circuits on the chip as mirror images of each other.

3. The method according to claim 2, wherein the driving the two or more ports includes simultaneously driving a same port on each of the two circuits with a drive signal having a same bias and a same phase at each of the two circuits.

4. The method according to claim 1, wherein the placing the two or more components includes placing four identical circuits on the chip.

5. The method according to claim 4, wherein the driving the two or more ports includes simultaneously driving a same port on each of the four circuits, same first drive signals driving each of a first set of diagonal ports and same second drive signals driving each of a second set of diagonal ports.

6. The method according to claim 5, wherein the driving the first set of diagonal ports and the second set of diagonal ports includes the first drive signals and the second drive signals having a same bias and different phase.

7. The method according to claim 1, further comprising identifying a location on the chip corresponding with a node of a chip mode frequency.

8. The method according to claim 7, wherein the placing the two or more components includes placing two ports symmetrically on the chip along the node.

9. The method according to claim 8, wherein the driving includes simultaneously driving the two ports with drive signals, the drive signals having a same bias and a different phase.

10. A system to control crosstalk among qubits on a chip, the system comprising:
    two or more components placed symmetrically on the chip, the two or more components including the qubits and two or more ports; and
    two or more drive signals applied symmetrically to the two or more ports to control the crosstalk based on controlling coupling of chip mode frequencies and qubit frequencies, the two or more drive signals including a same bias as and either a same phase as or a phase 180 degrees different than a phase of one or more other ones of the two or more drive signals.

11. The system according to claim 10, wherein the two or more components are two identical circuits placed as mirror images of each other on the chip.

12. The system according to claim 11, wherein the two or more drive signals are a first drive signal and a second drive signal respectively driving a same port on each of the two identical circuits, the first drive signal and the second drive signal having a same bias and a same phase.

13. The system according to claim 10, wherein the two or more components are four identical circuits placed on the chip.

14. The system according to claim 13, wherein the two or more drive signals are two first drive signals and two second drive signals that drive a same port on each of the four circuits.

15. The system according to claim 14, wherein the first drive signals, having a same bias and phase, drive a first set of diagonal ports and the second drive signals, having a same bias and a different phase from the first drive signals, drive a second set of diagonal ports.

16. The system according to claim 10, wherein the two or more components are two ports placed symmetrically on the chip along a node associated with a chip mode frequency of interest.

17. The system according to claim 16, wherein the two or more drive signals are a first drive signal and a second drive signal respectively driving each of the two ports, the first drive signal and the second drive signal having a same bias and a different phase.

* * * * *